(12) United States Patent
Allen et al.

(10) Patent No.: US 6,685,410 B1
(45) Date of Patent: Feb. 3, 2004

(54) SHEATH FOR PROTECTING A PIN-TAIL LOCKING BOLT

(75) Inventors: Terence P Allen, Deeside (GB); Reginald D Parson, Neston (GB)

(73) Assignee: Airbus UK Limited, Bristol (GB)

( * ) Notice: Subject to any disclaimer, the term of this patent is extended or adjusted under 35 U.S.C. 154(b) by 121 days.

(21) Appl. No.: 09/647,664

(22) PCT Filed: Aug. 22, 2000

(86) PCT No.: PCT/GB00/03232

§ 371 (c)(1),
(2), (4) Date: Oct. 4, 2000

(87) PCT Pub. No.: WO01/16494

PCT Pub. Date: Mar. 8, 2001

(30) Foreign Application Priority Data

Aug. 27, 1999 (GB) .............................................. 9920306

(51) Int. Cl.[7] .............................................. F16B 19/00
(52) U.S. Cl. ........................ 411/377; 411/386; 411/361
(58) Field of Search ................. 411/377, 373, 411/372.6, 372.5, 375, 433, 429, 361, 386; 138/96 T

(56) References Cited

U.S. PATENT DOCUMENTS

| 3,817,146 A | * | 6/1974 | Scott |
| 4,032,043 A | * | 6/1977 | Lajovic |
| 4,210,179 A | * | 7/1980 | Galer ........................ 138/96 T |
| 4,525,915 A | * | 7/1985 | Rich ........................... 411/371 |
| 5,908,277 A | | 6/1999 | Richards |
| 6,196,270 B1 | * | 3/2001 | Richards ................... 138/96 T |

FOREIGN PATENT DOCUMENTS

| GB | 0978280 | 12/1964 |
| GB | 1 515 038 | 6/1978 |
| GB | 2283552 A | 5/1995 |

* cited by examiner

Primary Examiner—Flemming Saether
(74) Attorney, Agent, or Firm—Nixon & Vanderhye P.C.

(57) ABSTRACT

The invention relates to a sheath 46 for protecting a fastener such as a pin-tail locking bolt 18 as it is passed through a passage 14, the sheath 46 defining a first hollow 52 at a first end for receiving part 28 of the pin-tail locking bolt 18 and a second hollow 54 at a second end suitable for collecting a substance such as a sealant 13 in the passage 14.

14 Claims, 2 Drawing Sheets

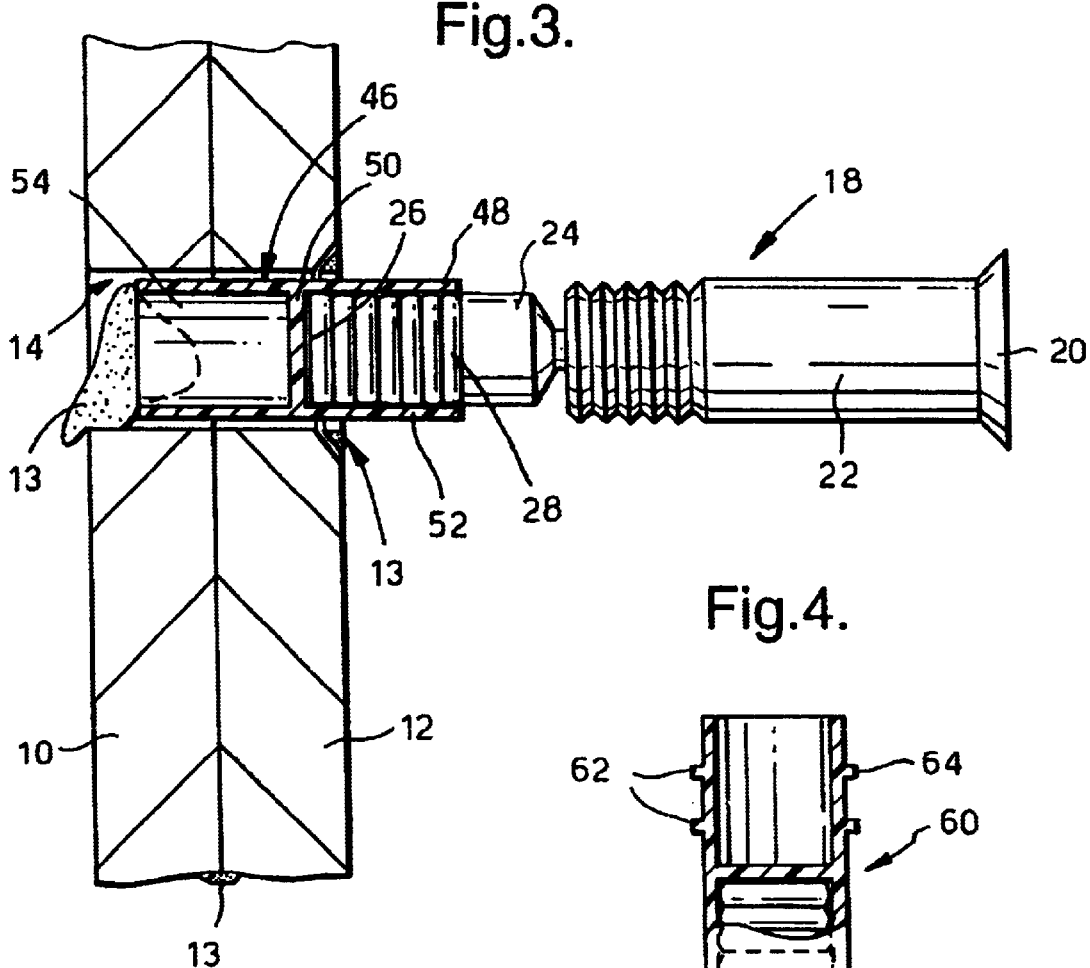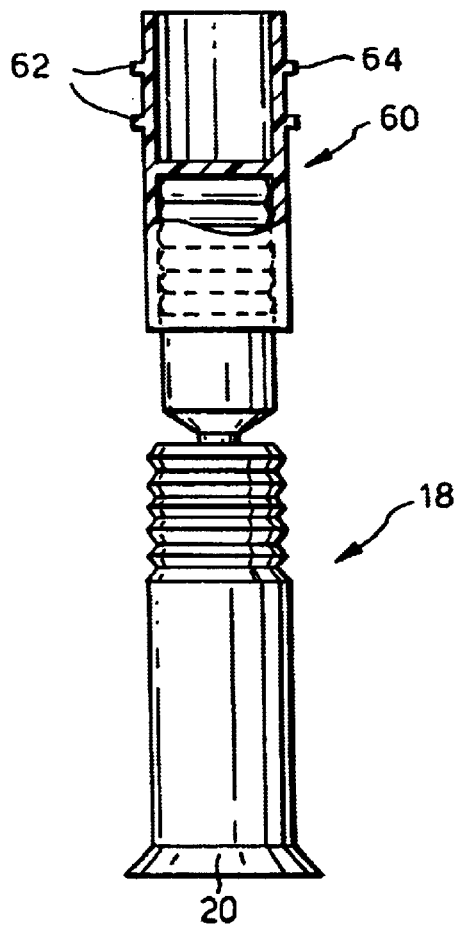

SHEATH FOR PROTECTING A PIN-TAIL LOCKING BOLT

This application is the U.S. national phase of International Application No. PCT/GB00/03232, filed Aug. 22, 2000, which designated the U.S., the entire contents of which is hereby incorporated by reference.

BACKGROUND OF THE INVENTION

1. Field of the Invention

The invention relates to the protection of a fastener primarily during placement through a passage in a plurality of elements where the passage contains a sealing substance.

2. Discussion of Prior Art

A known fastener will now be described with reference to FIGS. 1 and 2 of the accompanying drawings.

A known fastener will now be described with reference to FIGS. 1 and 2 of the accompanying drawings, in which:

FIG. 1 is a schematic cross section of a known pin-tail locking bolt positioned for fastening to sheet elements, and FIG. 2 is an elevation of the known pin-tail locking bolt of FIG. 1 drawn to a larger scale.

Referring to FIG. 1, it is known for elements such as two sections 10, 12 of an aircraft wing skin to be joined together in a fluid-tight manner. A passage 14 is formed through the skin sections 10, 12, the passage having a countersink 16 in an outer surface of the section 12. The skin sections 10, 12 have a flowable sealant 13 between them and sealant is also applied to the countersink 16.

Looking at FIG. 2, a pin-tail locking bolt 18 comprises a head 20, a shank 22 of diameter d1 and a pin-tail part 24 of diameter d2, where d1 is greater than d2. Towards one end 26 of the pin-tail part 24 arranged furthest from the head 20, a series of annular grooves 28 is provided. Towards the end 30 of the shank 22 spaced from the head, a series of annular grooves 32 is also provided. A point of weakness 34 defined by a reduced cross section is provided between the shank 22 and the pin-tail part 24.

Referring again to FIG. 1, the pin-tail locking bolt 18 is advanced through the passage 14. A pneumatic tool 38 has jaws 40 that receive the grooves 28 of the pin-tail bolt 18 and has a front face 41 that abuts the skin section 10. The jaws 40 then pull hard on the pin tail bolt 18 to clamp the skin sections 10, 12 together. An annular collar 42 is then swaged onto the grooves 32 in the shank 22, for example, by pneumatic devices 44. Continued pulling on the pin-tail bolt 18 by the pneumatic tool 38 eventually breaks the pin-tail part 24 away from the shank 22 of the installed bolt 18, at the point of weakness 34. However, as the pin-tail bolt 18 is advanced through the passage 14, sealant 13 squeezed into the passage 14 from between the skin sections 10, 12 and excess sealant applied to the countersink 16 is picked up by and contaminates the grooves 28. It is conventional to clean the pin-tail bolt 18 and particularly the grooves 28, with a rag prior to applying the pneumatic tool 38. However, such a cleaning operation is not efficient and the pneumatic tool 38 generally becomes contaminated by the sealant which is undesirable.

An aim of the invention is to protect the fastener against such contamination.

SUMMARY OF THE INVENTION

According to a first aspect of the invention there is provided a sheath for protecting a fastener as it is passed through a passage, the sheath defining a first hollow at a first end for receiving part of a fastener and a second hollow at a second end suitable for collecting a substance in the passage.

In that way, when the sheath-covered fastener passes through a passage occupied, say, by sealant, the first end of the sheath protects the fastener from contamination by the sealant whilst the second end of the sheath can collect sealant.

The sheath can be removed from the fastener after passing through the passage to expose the part of the fastener which is clean.

Preferably, the sheath further comprises an internal barrier to prevent sealant which enters the second hollow making contact with the fastener.

The barrier is preferably an internal wall, most preferably a bulkhead.

The sheath is preferably of circular cross sectional shape.

The sheath may be provided with at least one rib on its outer surface. The or each rib is preferably in the form of a circumferential projection, for example of annular form. The rib arrangement is useful for wiping sealant from the surface of the passage as the sheath passes there through.

Preferably the or each rib has a radially outer surface of convex cross-sectional shape.

Preferably, there are at least two ribs on the outer surface of the sheath.

According to a second aspect of the invention there is provided a sheath according to the first aspect of the invention or any of the consistory clauses relating thereto with a fastener therein.

The sheath is preferably a push or sliding fit on the fastener. Preferably, the fit is such that sealant is unable to pass between the sheath and that part of the fastener therein.

Where the barrier is provided, the fastener may abut the barrier. In that way, the barrier will provide a surface against which the fastener abuts to push the sheath through a passage.

Preferably, the part of the fastener within the sheath has grooving thereon.

Preferably, the fastener is a bolt and most preferably, a pin-tail locking bolt. In the latter case, the sheath preferably receives the pin-tail part of a pin-tail bolt. In that way, the pin-tail part remains protected from contamination by the sealant.

Where the pin-tail part of a locking bolt is of a lesser diameter than the main body of a pintail locking bolt, the sheath is preferably of a thickness that makes the pin-tail part with the sheath thereon similar in diameter to that of the main body thereby enabling the sheath to fit over the pin-tail part and still pass through the passage for which it is intended.

According to a third aspect of the invention there is provided a method for protecting a fastener during movement through a passage having a substance therein from which part of the fastener is to be protected, the method comprising the steps of, positioning the said part of the fastener within a sheath, advancing the fastener and the sheath through the passage such that the sheath shields the said portion of the fastener from contamination by the substance in the passage, and then removing the sheath from the fastener.

Preferably, the method comprises providing the fastener in the form of a bolt, most preferably a pin-tail locking bolt.

In the latter case, the method may comprise the step of fitting the sheath on the pintail part of the bolt.

Preferably, the method comprises forming the passage in a plurality of elements such as skin panels for an aircraft.

The sheath may be of greater length than the passage.

BRIEF DESCRIPTION OF THE DRAWINGS

Fastener protection in accordance with the invention will now be described by way of example with reference to the remaining accompanying drawings, in which;

FIG. 3 is a cross section of a sheath in accordance with the invention fitted onto the pin-tail locking bolt of FIG. 2.

FIG. 4 is a cross section of a further sheath in accordance with the invention.

DETAILED DESCRIPTION OF PREFERRED EMBODIMENTS

Figure 2:
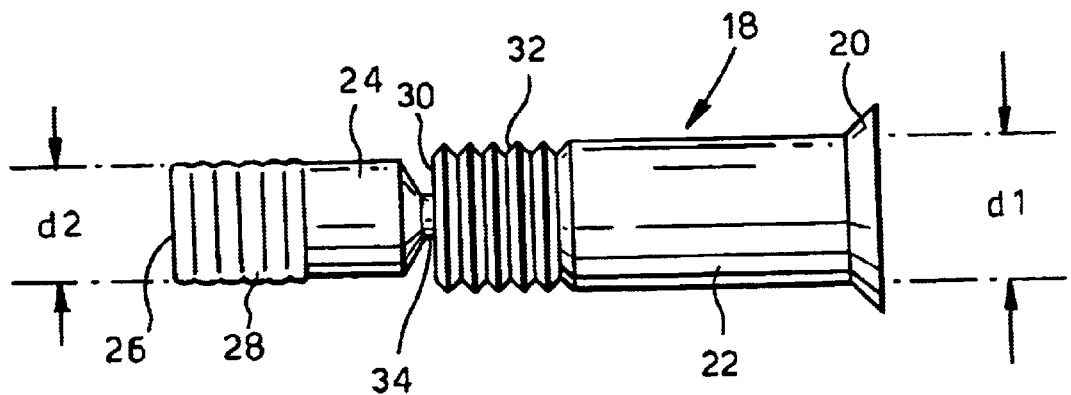
FIG. 2 is an elevation of the known pin-tail locking bolt of FIG. 1 drawn to a larger scale.

Referring to FIG. 3, the pin-tail locking bolt 18 of FIG. 2 has a sheath 46 fitted thereto. The sheath 46 comprises a cylindrical tube 48 having an internal bulkhead 50 approximately midway along its length, the tube and the bulkhead defining a first hollow 52 and a second hollow 54. The sheath 46 is formed from a suitable plastics material, for example by moulding.

The sheath 46 is pushed onto the free end 26 of the pin-tail part 24, so that the free end 26 abuts the bulkhead 50. The tube 48 is of a length that allows the grooves 28 to lie in the first hollow 52 covered by the sheath 46. The sheath 46 is of a thickness such that the pin-tail part 24 with the sheath 46 thereon is similar in outer diameter to the shank 22 thereby enabling the sheath 46 to fit over the pin-tail part 24 and pass through the passage 14, the passage 14 being dimensioned to receive the shank 22.

Figure 1:
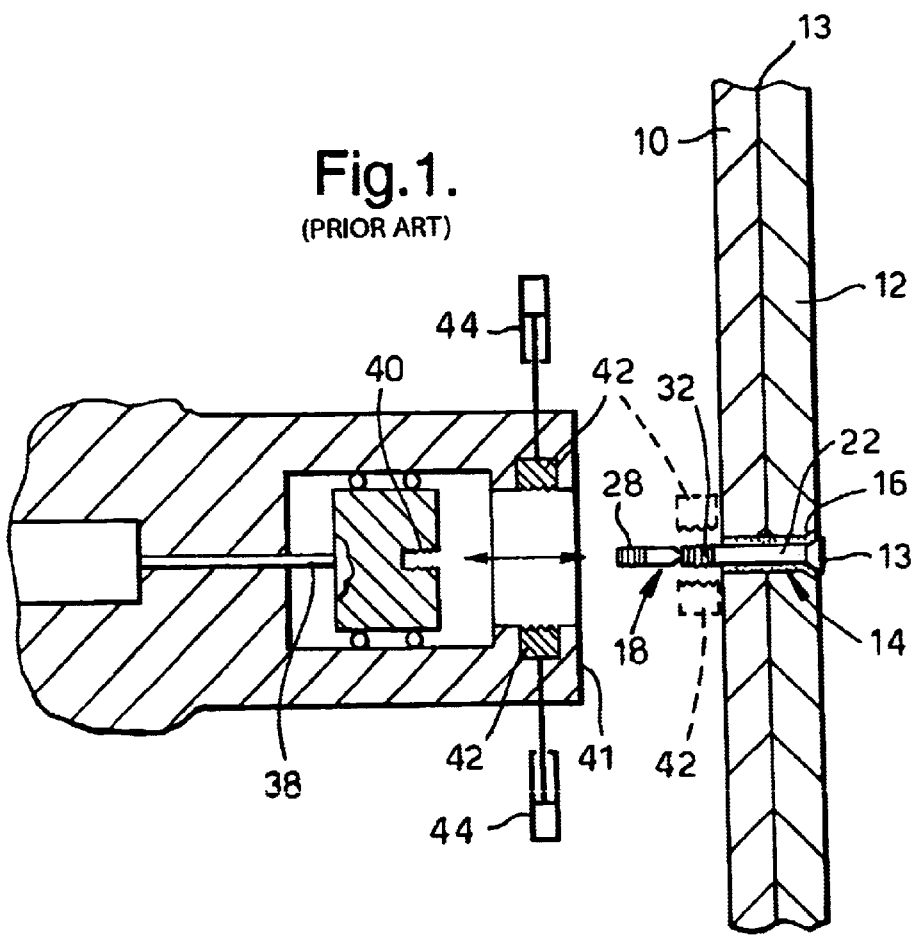
FIG. 1 is a schematic cross section of a known pin-tail locking bolt positioned for fastening to sheet elements.

The bolt 18 and the sheath 46 are then pushed, sheath first, through the passage 14 in the sheet elements 10, 12 of a wing skin, the passage 14 being occupied by sealant as described with respect to FIG. 1. The second hollow 54 collects sealant 13 as the sheath 46 moves through the passage 14 but the presence of the bulkhead 50 ensures that the sealant 13 does not make contact with the pin-tail part 24. The head 20 of the bolt 18 sits in the countersink 16 (see FIG. 1) and the grooves 28 covered by the sheath 46 and the further grooves 32 project from the inner section 10 of the wing skin. The sheath 46 is then removed from the grooves 28, for example using pliers or grips (not shown). The pin-tail bolt 18 is then installed on the sections 10, 12 using the pneumatic tool 38 in the known manner described earlier. It will be appreciated that by using the sheath 46, the jaws 40 of the pneumatic tool 38 are no longer in danger of becoming clogged with the sealant 13.

Looking at FIG. 4, a further embodiment of the sheath 60 is shown. Parts corresponding with parts in FIG. 3 are given the same reference numerals and only the differences will be described. The sheath 60 includes annular circumferential ribs 62. The annular ribs 62 are arranged towards the leading end of the sheath 46. Each annular wall 62 has an outer part 64 of convex cross section. In use, the ribs 62 wipe sealant from the surface of the passage 14. The outer part 64 may be slightly larger in outer diameter than the passage 14 but it resiliently deforms inwardly to give a tight fit between the passage 14 and the ribs 62.

The sheath 46, 60 may be adapted for use on different types of fasteners if desired.

The shapes of the sheath 46, 60 in different embodiments may vary from these shown and so may the shapes of the first and second hollows 52, 54.

What is claimed is:

1. A protective sheath for a pin tail locking bolt, said bolt having a shank portion and an annular grooved pin-tail portion, said sheath protecting the pintail portion from contamination during insertion into a passage, said sheath comprising a cylindrical tube having at least one end portion having an outer diameter not greater than a diameter of said shank portion of said bolt and having an internal diameter sized to be a push fit over the annular grooved pin-tail portion of said bolt.

2. A protective sheath according to claim 1, wherein said cylindrical tube has two ends and a bulkhead therebetween for preventing fluid communication between said two ends.

3. A protective sheath according to claim 2 used in conjunction with a sealant in said passage, wherein said cylindrical tube other end includes a hollow portion separated by said bulkhead from said at least one end, said other end hollow portion for collecting sealant in said passage during insertion of said bolt into said passage.

4. A sheath according to claim 1, in which the sheath is removable from the fastener after passing through the passage to expose a part of the fastener which is clean.

5. A sheath according to claim 1, in which the sheath is of circular cross sectional shape.

6. A sheath according to claim 1, in which the sheath is provided with at least one rib on its outer surface.

7. A sheath according to claim 1, in which the or each rib is in the form of a circumferential projection, for example of annular form.

8. A sheath according to claim 1 with a fastener therein.

9. A sheath according to claim 1, in which the pin-tail part of the locking bolt is of a lesser diameter than the shank of the pintail locking bolt, and the sheath is of a thickness such that the pin-tail part with the sheath thereon is similar in outer diameter to the main body, thereby enabling the sheath to fit over the pin-tail part and pass through the passage.

10. A method for protecting a pin-tail locking bolt fastener during movement through a passage having a substance such as sealant therein from which part of the fastener is to be protected, the method comprising the steps of:

positioning the pin-tail portion of the fastener within a sheath according to claim 1, advancing the fastener and the sheath through the passage such that the sheath shields the said portion of the fastener from contamination by the substance in the passage, and removing the sheath from the fastener.

11. A method according to claim 10, in which the method comprises providing the fastener in the form of a bolt such as a pin-tail locking bolt.

12. A method according to claim 10, including providing the fastener in the form of a pin-tail locking bolt and fitting the sheath on the pin-tail part of the bolt.

13. A method according to claim 10, in which the method comprises forming the passage in a plurality of elements such as skin panels for an aircraft.

14. A method according to claim 10, in which the sheath is of greater length than the passage.

* * * * *